(12) United States Patent
Winner et al.

(10) Patent No.: US 6,810,311 B2
(45) Date of Patent: Oct. 26, 2004

(54) METHOD AND DEVICE FOR DETERMINING OFFSET VALUES BY A HISTOGRAM METHOD

(75) Inventors: Hermann Winner, Bietigheim (DE); Werner Urban, Vaihingen/Enz (DE); Jens Lueder, Kornwestheim (DE); Frieder Keller, Ubstadt-Weiher (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/150,304

(22) Filed: May 16, 2002

(65) Prior Publication Data

US 2003/0074116 A1 Apr. 17, 2003

(30) Foreign Application Priority Data

May 16, 2001 (DE) ......................................... 101 23 843
Feb. 14, 2002 (DE) ......................................... 102 05 971

(51) Int. Cl.[7] ........................ B60G 17/01; B60K 31/00; G06F 1/00
(52) U.S. Cl. ............................ 701/29; 701/36; 702/150
(58) Field of Search ............................. 701/29, 36, 72, 701/96; 702/150, 151, 96; 303/113.2, 140, 186, 189; 244/164, 171

(56) References Cited

U.S. PATENT DOCUMENTS 4,914,564 A * 4/1990 Surauer et al. ............... 700/33
5,382,206 A * 1/1995 Oda et al. .................... 477/108
5,454,442 A * 10/1995 Labuhn et al. ............... 180/169
5,602,732 A * 2/1997 Nichols et al. ........ 364/424.034
5,623,408 A * 4/1997 Motamedi et al. ........... 364/424
5,719,790 A * 2/1998 Lohrenz et al. ........ 364/571.03
5,732,379 A * 3/1998 Eckert et al. ................. 701/83
5,979,581 A * 11/1999 Ravani et al. ............... 180/168
6,317,674 B1 * 11/2001 Lohberg et al. ............... 701/72
6,377,906 B1 * 4/2002 Rowe .......................... 702/151

FOREIGN PATENT DOCUMENTS

| DE | 44 19 364 | 12/1995 |
|---|---|---|
| DE | 196 36 443 | 3/1998 |
| DE | 197 22 947 | 2/1999 |

* cited by examiner

Primary Examiner—Tan Q. Nguyen
Assistant Examiner—Dalena Tran
(74) Attorney, Agent, or Firm—Kenyon & Kenyon

(57) ABSTRACT

A method is for determining the offset value of the output signal of a vehicle sensor. The values of the output signal of the vehicle sensor are determined. The value range of the output signal of the vehicle sensor is divided into at least two partial ranges (intervals, classes). The values of the output signal are allocated to the partial ranges. The number of number quantities representing the values of the output signal allocated to the partial ranges is determined. The number quantities are determined by at least one low-pass filter.

16 Claims, 7 Drawing Sheets

Vehicle Control System

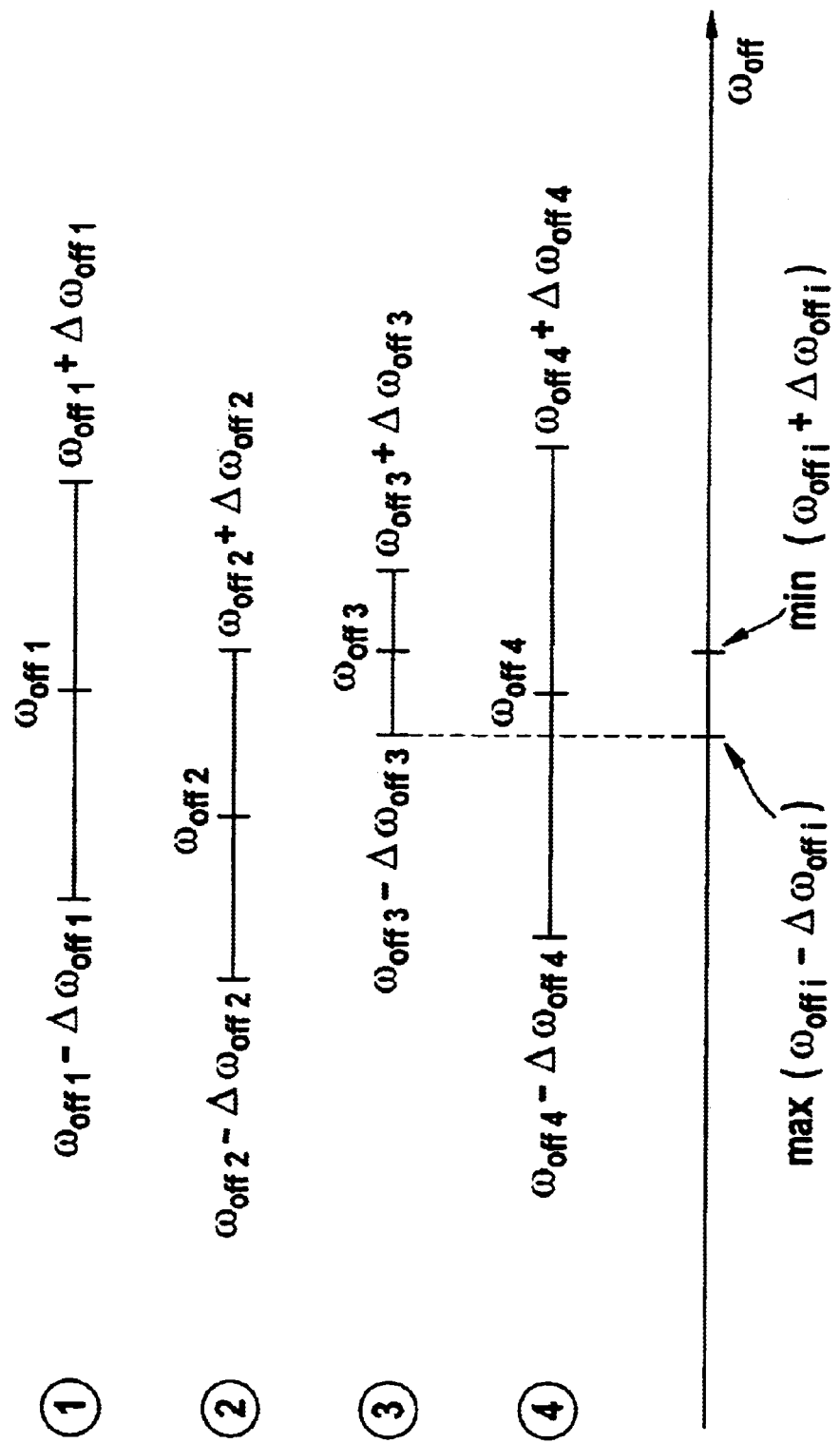

METHOD AND DEVICE FOR DETERMINING OFFSET VALUES BY A HISTOGRAM METHOD

FIELD OF THE INVENTION

The present invention relates to a device and a method for determining a corrected offset value.

BACKGROUND INFORMATION

Adaptive cruise control (ACC) for a vehicle regulates the distance maintained from the vehicle in front as a function of vehicle speed. A method is described in German Published Patent Application No. 197 22 947 from this field, whereby, among other things, the future course of a vehicle including an ACC system is taken into account in the ACC regulation. To do so, the future course range of at least one vehicle driving in front is determined, and then a lateral transverse offset is determined in relation to all vehicles detected. In steady-state road surface curvature conditions, i.e., when traveling along a straight route or in an area of constant curvature in a turn, the future driving corridor is easily determined using the conventional method with the help of a yaw rate signal or a rotational rate signal.

German Published Patent Application No. 196 36 443 describes a system for monitoring sensors in a vehicle. This system includes an arrangement with which identically defined comparison quantities for the sensors are determined for at least two sensors, starting from at least the signals generated by them. Furthermore, the system includes an additional arrangement with which a reference quantity is determined as a function of the comparison quantities at least thus determined. Starting from at least the reference quantity thus determined, monitoring is performed in a monitoring arrangement for at least one sensor. In addition to the monitoring arrangement, the system also includes an arrangement with which the signal generated by it is corrected for at least one sensor, at least as a function of the reference quantity.

German Published Patent Application No. 44 19 364 describes a method of realtime determination of the offset of a test signal. The test signal is determined in the form of digital measured values at fixed time intervals. The measured values are stored in a histogram over a fixed period of time. A measured value range measured most frequently in the fixed period of time is determined as the offset time of the test signal.

SUMMARY

The present invention relates to a method of determining the offset value of the output signal of a vehicle sensor,
  in which the values of the output signal of the vehicle sensor are determined,
  in which the value range of the output signal of the vehicle sensor is divided into at least two partial ranges (intervals, classes),
  in which the values of the output signal are allocated to the partial ranges,
  in which the number of number quantities representing the values of the output signal allocated to the partial ranges is determined.

The present invention may provide that the number quantities are determined by at least one low-pass filter. Determination by a low-pass filter is described because it is possible to implement low-pass functions without any great complexity, e.g., in controller software.

An example embodiment is characterized in that
  a separate low-pass filter is allocated to the at least two partial ranges (intervals, classes),
  each of the low-pass filters determines the number quantity allocated to its partial range.

This method may use one or more low-pass filters having an exponential characteristic (this is related to the fact that low-pass filters having an exponential characteristic are especially suitable for use as counters).

An example embodiment is characterized in that
  the low-pass filter, in whose allocated partial range the value of the output signal determined at a sampling time falls, is triggered with a first input signal, and
  the low-pass filters, in whose allocated value ranges the value of the output signal determined at the same sampling time does not fall, are triggered with a second input signal,
  the second input signal differing from the first input signal.

After determining the partial range in which the sensor value thus obtained falls, the various low-pass filters may be triggered easily with different input signals. Due to the different input signals (e.g., 0 or 1), there are different output signals of the low-pass filters. This may also be desirable, because the filling of the individual histogram classes (=partial ranges) changes during the counting operation.

An example embodiment of the present invention is based on the fact that
  as a result of triggering of the low-pass filter with a first input signal (k=1), the number quantity determined by this low-pass filter is incremented, and
  as a result of triggering of the low-pass filters with a second input signal (k=0), the number quantities determined by these low-pass filters is decremented.

Decrementing the number quantities in the low-pass filters not instantaneously affected by the filling operation ensures that not all low-pass filters will achieve extremely high counts in the course of time.

Another example embodiment of the present invention is based on the fact that
  a first average is determined by a first method from at least two successively determined values of the output signal of the vehicle sensor, and
  instead of the values of the output signal of the vehicle sensor, the averages obtained by the first method are allocated to the partial ranges.

Thus, instead of using the output signals of the vehicle sensor itself, averages of these output signals are used in the histogram. This makes it possible to filter out any high-frequency interference that might occur, which in turn has a positive effect on the stability of the method.

For example, the vehicle sensor may be a rotational rate sensor which detects the yawing motion of the vehicle. The offset value thus determined may be used for automatic distance regulation and/or control (ACC) in the motor vehicle.

An example embodiment is characterized in that
  the offset value is determined by forming a weighted average, and
  the partial range (interval, class) having the largest number quantity plus at least one adjacent interval (class) are taken into account in forming the weighted average.

In this manner, the offset value may be determined more reliably and in a more stable manner than if only the partial range having the largest number quantity is taken into account. This is related to the fact that variance effects (i.e., the scatter band of the data) may now also be taken into account.

An example embodiment is characterized in that the linear or quadratic values of the number quantities enter into the weighting factors of the weighted average. This method is very simple to implement.

This method according to the present invention may be used in parallel with other methods of determining the offset value. It is possible to determine a more accurate corrected or averaged offset value by combined or parallel use of different methods of determining the offset value. This may be performed, for example, by forming the average.

The vehicle sensor is a sensor that detects at least one motion of a vehicle. At least two analyses of the output signal performed at at least two different points in time enter into the determination of the offset value The determination of the offset value is based on a sorting of at least two of these analyses of the output signal.

In the present invention, the motion values representing the motion of the vehicle may be determined by the analysis of the output signal. The sorting operation may be implemented by sorting the motion values thus determined according to size.

At least a subset of possible motion values obtainable by analysis of the output signal ($\omega$) of the vehicle sensor (21b) may be divided into at least two intervals. The determination of the offset value may be based on the allocation of the motion values obtained by the analysis of the output signal to the intervals, and the determination of the offset value may be based on the number of motion values allocated to the intervals.

In analysis of the respective number of motion values allocated to the at least two intervals, the interval having the greatest number of allocated motion values may be determined, and the offset value may be determined as a function of this interval thus determined.

The offset value may be determined by forming a weighted average. The interval having the greatest number of allocated motion values as well as at least one adjacent interval may be taken into account in this formation of the weighted average, for example.

The linear or quadratic values of the number of allocated motion values may enter into the weighting factors of the weighted average.

The number of motion values allocated may be limited to a certain value range by low-pass filtering. In an example embodiment, it may be low-pass filtering having an exponential characteristic.

In addition, at least one subset of possible motion values obtainable by analysis of the output signal of the vehicle sensor is divided into at least two intervals. The determination of the offset value is based on the allocation of the motion values obtained by analysis of the output signal to the intervals and to low-pass filtering.

In this low-pass filtering, a low-pass filter having an exponential characteristic may be used.

An example embodiment of the present invention is illustrated in the following drawing and explained in greater detail in the following description.

BRIEF DESCRIPTION OF THE DRAWINGS

FIG. 7 illustrates in a qualitative representation the case when, in addition to the offset value, an error band is also determined by the various methods, illustrating how the corrected offset value is determined by forming an average between the minimum of all maximum values and the maximum of all minimum values.

DETAILED DESCRIPTION

The present invention will now be described on the basis of FIGS. 1 through 7. The form of the selected example embodiment—use of the device and the method according to the present invention in a system for automatic distance regulation in a vehicle—shall not restrict the scope of the present invention.

Figure 1:
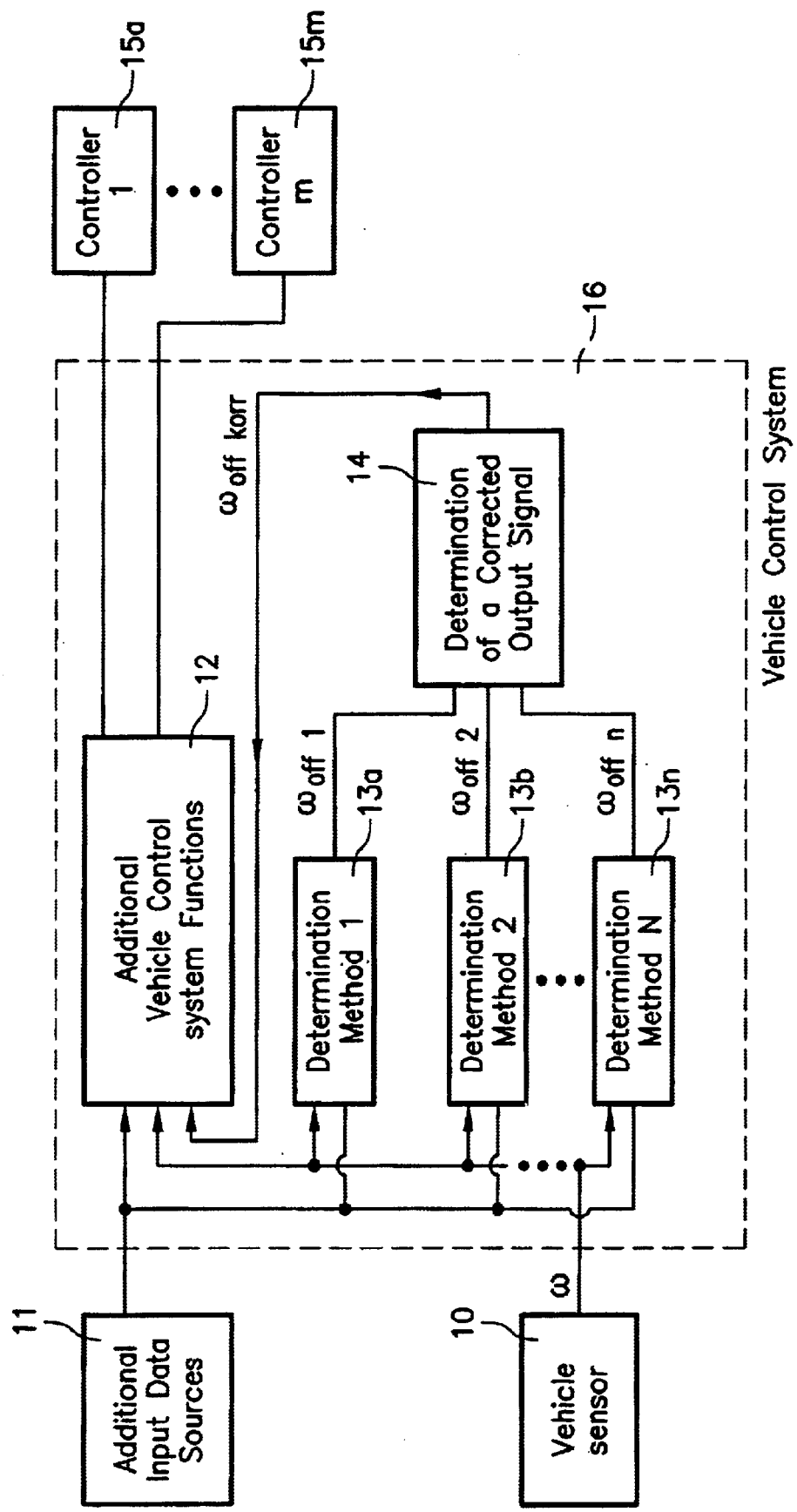
FIG. 1 schematically illustrates a vehicle control system and its input and output channels and illustrates the functions that may be important for the present invention.

FIG. 1 is a schematic diagram of a vehicle control system 16 and the input and output channels of the present invention. The output signals of a vehicle sensor 10 and other signals from other input data sources 11, not specified further here, are available as input signals of vehicle control system 16 on the input channels.

The vehicle control system is composed of blocks 13a, ..., 13n, which are used for determining offset values $\omega_{off1}, \ldots, \omega_{offn}$ which represent the offset of the output signal of vehicle sensor 10, block 14 in which a corrected offset value $\omega_{offcorr}$ is determined from offset values $\omega_{off1}, \ldots, \omega_{offn}$ determined in blocks 13a, ..., 13n, and block 12, which includes all the other functions of vehicle control system 16.

The output signals of vehicle control system 16 go to m additional controllers 15a, ..., 15m. These m additional controllers may include, for example, the engine controller, the ESP controller (ESP=electronic stability program) or the transmission control in an example embodiment. It is also possible for the output signals of vehicle control system 16 to be relayed to a driver information system.

Figure 2:
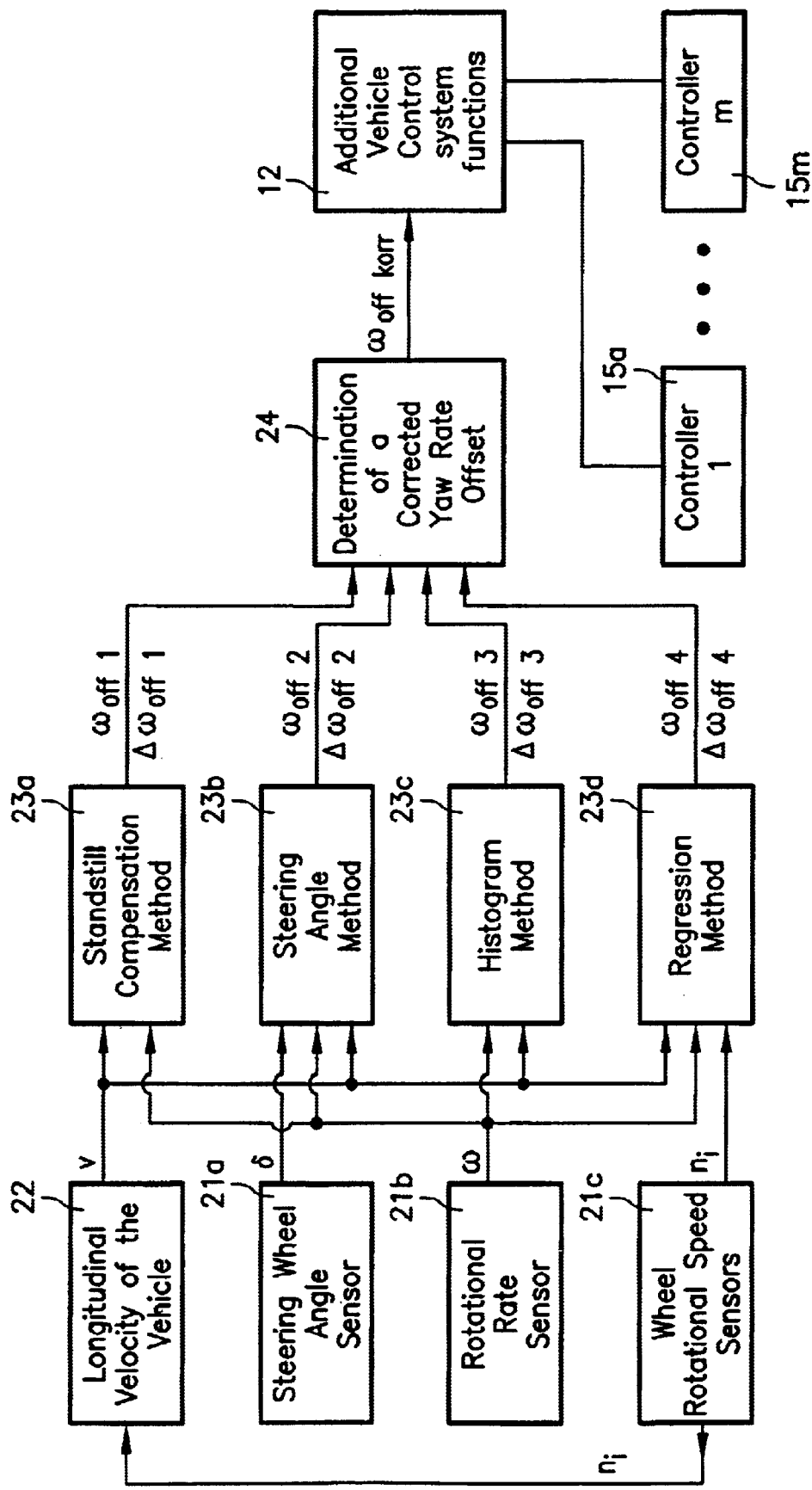
FIG. 2 illustrates an example embodiment of the-present invention for the case that the vehicle sensor is a rotational rate sensor, the offset value of the output signal of the rotational rate sensor is determined as a function of the output signal of the rotational rate sensor itself and of the output signals of additional sensors which detect the steering wheel angle and the wheel rotational speeds, and the offset value of the output signal of the rotational rate sensor is determined by the following four methods: standstill compensation method, steering angle method, histogram method and regression method.

FIG. 2 illustrates an example embodiment of the present invention for the case of a system for adaptive cruise control (ACC). The sensors used in the present invention as well as the input and output channels have been illustrated.

In this example embodiment, vehicle sensor 10 is configured as a rotational rate sensor 21b. Additional input sources 11 are configured as steering wheel angle sensor 21a and as wheel rotational speed sensors 21c.

Rotational rate sensor 21b supplies an output signal $\omega$ which represents the yaw rate, steering wheel angle sensor 21a supplies an output signal $\delta$ which represents the steering wheel angle, and wheel rotational speed sensors 21c supply output signals $n_i$ which represent the wheel rotational speeds of the individual wheels.

These output signals $\omega$, $\delta$ and $n_i$ as well as signal v representing the longitudinal velocity of the vehicle enter into vehicle control system 16 as input signals. The longitudinal velocity of the vehicle is not generally detected directly by a sensor, but instead is determined from signals $n_i$ supplied by wheel rotational speed sensors 21c representing the wheel rotational speeds of the individual wheels. This determination may be performed, for example, in the controller of a driving dynamics regulation system (ESP).

The offset value of output signal $\omega$ of rotational rate sensor 21b is determined by the four following methods in vehicle control system 16:

by a standstill compensation method 23a,
by a steering angle method 23b,
by a histogram method 23c and
by a regression method 23d.

Standstill compensation method 23a requires as input signals signal v representing the longitudinal velocity of the vehicle as well as signal $\omega$ representing the yaw rate. Steering angle method 23b also requires signal $\delta$, representing the steering wheel angle, in addition to these two quantities. The input signal needed for the histogram method 23c is signal $\omega$ representing the yaw rate plus signal v representing the longitudinal velocity of the vehicle. Regression method 23d requires as input signals signals $n_i$ representing the wheel rotational speeds, signal $\omega$ representing the yaw rate and signal v representing the longitudinal velocity of the vehicle.

As output signals, standstill compensation method 23a supplies a signal $\omega_{off1}$ which represents an approximate value for the yaw rate offset of rotational rate sensor 21b as well as an is additional signal $\Delta\delta_{off1}$ which represents the half-width of the respective error band. Steering angle method 23b supplies a signal $\omega_{off2}$ which represents an approximate value for the yaw rate offset of rotational rate sensor 21b as well as an additional signal $\Delta\omega_{off2}$ which represents the half-width of the respective error band. Histogram method 23c supplies a signal $\omega_{off3}$ which represents the yaw rate offset of rotational rate sensor 21b as well as an additional signal $\Delta\omega_{off3}$ which represents the half-width of the respective error band.

Regression method 23d supplies a signal $\omega_{off4}$ which represents the yaw rate offset of rotational rate sensor 21b as well as an additional signal $\Delta\omega_{off4}$ which represents the half-width of the respective error band.

So far, a distinction has been made between signals and the physical quantities represented by the signals. To simplify the discussion, this distinction will no longer be strictly retained in the following discussion. The quantities $\omega$, $\delta$, $n_i$, v, $\omega_{off1}$, $\omega_{off2}$, $\omega_{off3}$, $\omega_{off4}$, $\Delta\omega_{off1}$, $\Delta\omega_{off2}$, $\Delta\omega_{off3}$ and $\Delta\omega_{off4}$ shall no longer designate just the signals but instead shall also refer to the quantities represented by the signals.

Generally, the word "signal" will be used preceding the respective quantity when referring to the signal and not the physical quantity.

The error band is a measure of the maximum absolute error to which the quantity representing the offset of the output signal of rotational rate sensor 21b is subject.

With the example of the standstill compensation method, this means that the true offset value of the yaw rate sensor is in all probability between the values ($\omega_{off1}-\Delta\omega_{off1}$) and ($\omega_{off1}+\Delta\omega_{off1}$). Thus, the term "half-width $\Delta\omega_{off1}$" also becomes clear. The same thing is also true of the error bands in the other three methods.

From these approximation values, $\omega$off1, ..., $\omega_{off4}$ as well as the respective widths of the error bands, a corrected offset value $\omega_{offcorr}$ which is characterized by a greater accuracy in comparison with quantities $\omega_{off1}, \ldots, \omega_{off4}$, of the yaw rate sensor is calculated in arrangement 24, representing an example embodiment of arrangement 14.

It should be pointed out that the four methods used, namely the standstill compensation method, the steering angle method, the histogram method and the regression method each have a different validity range, depending on the driving status. This means that, depending on the driving status, perhaps not all four methods used will determine the quantities representing the offset value at the same time. In the methods which do not determine any quantities representing the offset value at the moment, the last valid quantity representing the offset value determined by this method is used. At the same time, the error band determined for this quantity is widened over time. This means that the respective error band becomes wider, the longer it has been since the last valid determination of this quantity representing the offset value. This reference back to the last offset value determined requires storage of at least the last offset value determined as well as the last error band width determined for each method.

Figure 3:
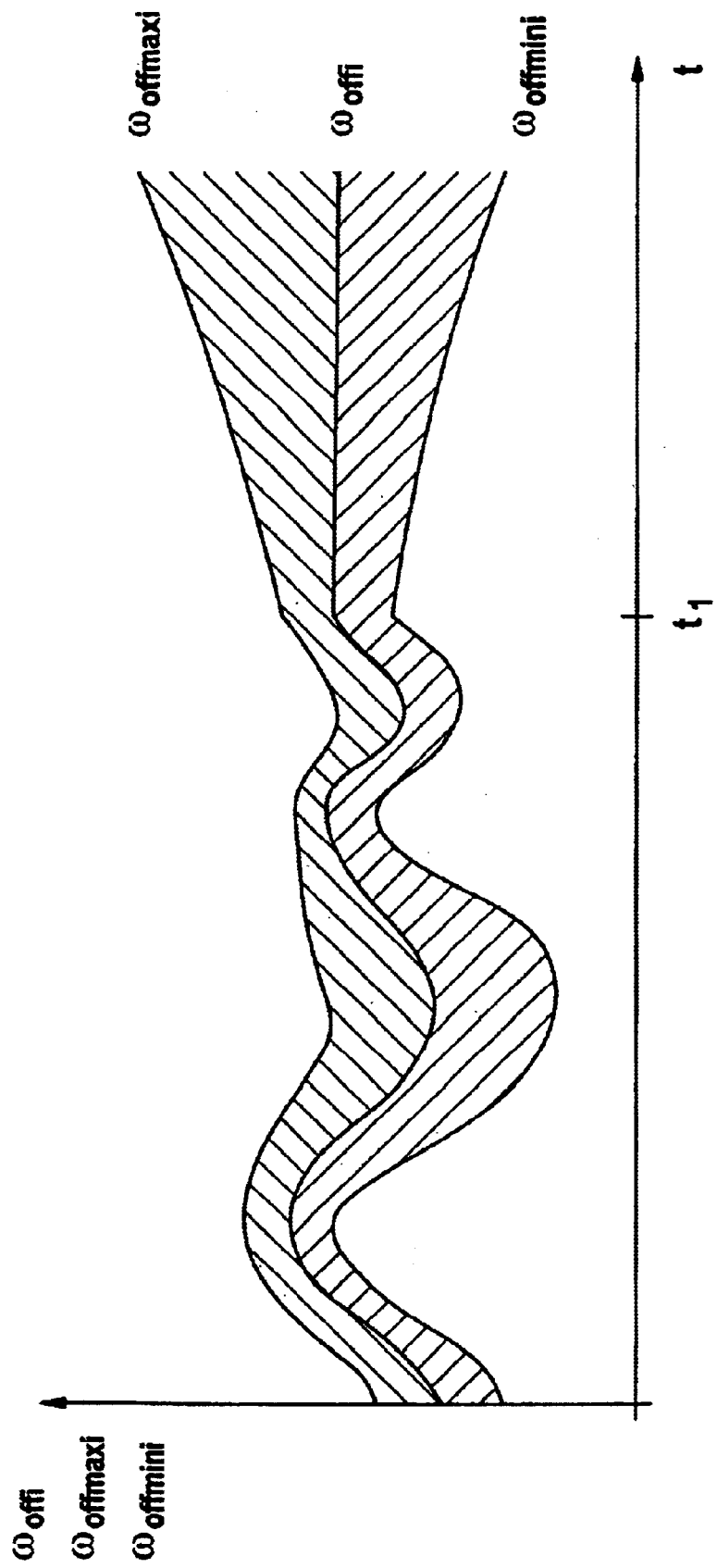
FIG. 3 illustrates the time characteristic of a yaw rate offset thus determined and the respective error band in a qualitative representation.

This widening of the error band is illustrated qualitatively in FIG. 3 In this x–y diagram, time t has been plotted on the abscissa, and quantities $\omega_{offi}$, $\omega_{offmini}$ and $\omega_{offmaxi}$ have been plotted on the ordinate, where $\omega_{offi}$ denotes the offset value of the yaw rate sensor determined by the i–th method; $\omega_{offmini}$ is the minimum value determined by the error band, i.e., $\omega_{offmini}=\omega_{offi}-\Delta_{offi}$ and $\omega_{offmaxi}$ is the maximum value defined by the error band, i.e., ($\omega_{offmaxi}=\omega_{offi}+\Delta\omega_{offi}$. It should also be pointed out that it is possible for the determination of $\omega_{offmini}$ and $\omega_{offmaxi}$ from $\omega_{offi}$ to use different $\omega_{offi}$ values, i.e., $\omega_{offi}$ is no longer exactly in the middle between $\omega_{offmini}$ and $\omega_{offmini}$. This may be accomplished through the introduction of weighting factors, i.e., $\omega_{offmini}=\omega_{offi}-c_1\cdot\Delta\omega_{offi}$ and $\Delta\omega_{offmaxi}=(\omega_{offi}+c_2\cdot\Delta\omega_{offi}$ where $c_1$, and $c_2$ are different weighting factors which may be constant but may also depend on parameters such as time.

The validity range for the i–th method extends from time t=0 to time t=$t_1$. For times t>$t_1$, it shall be assumed that the validity prerequisites are no longer met. Therefore, for t>$t_1$ no additional offset values are determined and instead the offset value determined for time $t_1$ is used. The error band defined by values $\omega_{offmini}$ and $\omega_{offmaxi}$ is then widened continuously for t>$t_1$.

Corrected offset value $\omega_{offcorr}$ thus determined is sent to another block 12 where additional functions of the vehicle control system are implemented. Block 12 also has quantity $\omega_{offcorr}$ as an input signal in addition to other quantities.

Details of blocks 23a, 23b, 23c and 23d are described below; these blocks supply quantities $\omega_{off1}, \ldots, \omega_{off4}$ which represent the offset of the output signal of rotational rate sensor 21b.

Standstill compensation method 23a supplies quantities $\omega_{offi}$ which represent the offset of the output signal of rotational rate sensor 21b, independently of the instantaneous motion status of the vehicle, i.e., also in the case of a vehicle which is not standing still.

The standstill case is ascertained when the following three conditions a), b) and c) are met simultaneously:

a) The longitudinal velocity of the vehicle is less than a first predetermined maximum value, which is designated as limit velocity $v_G$.

b) Yaw rate ω is less than a second predetermined maximum value.

c) The yaw acceleration, which is the time derivation of the yaw rate, is less than a third predetermined maximum value.

In the case of a very low longitudinal velocity v of the vehicle, very low wheel rotational speeds $n_i$ which then prevail are no longer detected by the wheel rotational speed sensors and are incorrectly recognized as being zero. Therefore, in a device in the vehicle for determining the longitudinal velocity of the vehicle, this is incorrectly determined as being negligible. Limit velocity $v_G$ is the longitudinal velocity of the vehicle which is still detected as being not negligible. For each longitudinal velocity below limit velocity $v_G$, the longitudinal velocity is incorrectly determined to be zero.

Points b) and c) ensure that a vehicle which has a negligible longitudinal velocity and is standing on a rotating plate will not be detected as standing still.

For the standstill compensation, output signal ω of rotational rate sensor 21b is input into block 23a at regular discrete sampling times $t_i$ at constant time intervals $t_a$. At the same time, a check is performed at these sampling times $t_i$ to ascertain whether conditions a), b) and c) which define a standstill are met. In addition, a time interval $T_n = n \cdot \Delta t_a$ is defined, wherein n is an integer greater than 2. If conditions a), b) and c) which define a standstill are met during a time interval $T_n$ at all sampling times $t_i$ falling within this interval, then a standstill is regarded as confirmed. Such a time interval $T_n$ during which conditions a), b) and c) which define a standstill are all met simultaneously at each sampling time falling within this interval is referred to below as the fulfillment interval.

Figure 4:
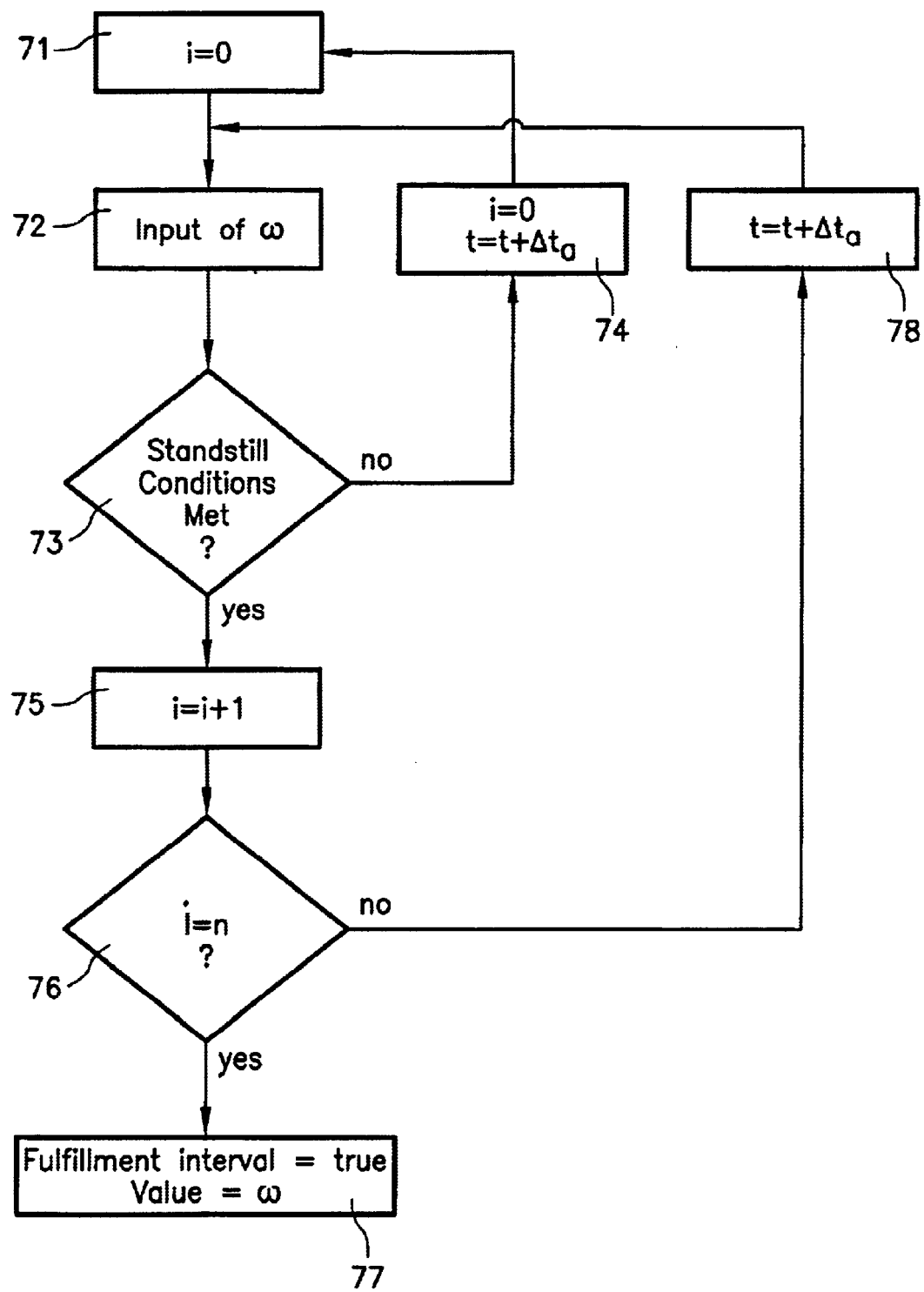
FIG. 4 illustrates in the form of a flow chart the determination of a fulfillment interval, which may be needed for the calculation of the yaw rate offset value by the standstill compensation method.

The process sequence for detection of a fulfillment interval is illustrated in FIG. 4. In block 71, integral variable i=0 is set. Then in block 72, output signal ω of the yaw rate sensor is input. In block 73, a check is performed to determine whether all three standstill conditions a), b) and c) are met at the same time. If this is the case, then in block 75 number i is incremented by 1. If this is not the case, then in block 74 i=0 is set and at the same time the sequence begins with block 71 again at a time which is later by time interval $t_a$. Variable i indicates the number of uninterrupted fulfillments of all three conditions a), b) and c) which define a standstill. In block 76 a check is performed to determine whether this number i of uninterrupted fulfillments has reached value n. If this is the case, then in block 77 detection of a fulfillment interval is documented by "fulfillment interval=true." At the same time, most current value ω of the output signal of the yaw rate sensor is allocated to the variable "value." In this example embodiment, it is a filtered value. If number i in block 76 has not yet reached value n, then at a point in time which is later by interval $t_a$ (block 78) the output signal of yaw rate sensor ω is input again in block 72.

As soon as a fulfillment interval has been detected, the length of the following time interval may be shortened. Instead of time interval $T_n$, shorter time interval $T_m$ replaces it now, this interval having the length of time interval $T_m = m \cdot \Delta t_a$, where m is an integer smaller than n. Only when the case of non-standstill has been detected again does it return to longer time interval $T_n = n \cdot \Delta t_a$ and retain this length of the time interval again until a fulfillment interval has been detected again.

For the determination of offset value $\omega_{off1}$ in block 23a, signal ω sampled last of the next-to-last fulfillment interval is used. The only exception here is the first fulfillment interval which is also characterized by a greater length $T_a = n \cdot \Delta t_a$. Since there is no directly preceding fulfillment interval here, signal ω sampled last is used here in this fulfillment interval for the determination of offset value $\omega_{off1}$ in block 23a. Instead of the signal sampled last, a filtered or averaged signal or a signal that has been both filtered and averaged may also be used.

To illustrate the functioning of the standstill compensation in block 23a, the following linear vehicle motion having a negligible yaw rate and negligible yaw acceleration shall be considered.

Phase 1: The vehicle travels at a constant longitudinal velocity.

Phase 2: The vehicle begins to brake. The longitudinal velocity of the vehicle is still greater than limit velocity $v_G$ defined in a).

Phase 3: The braking operation ceases. The longitudinal velocity of the vehicle is already lower than limit velocity $v_G$.

Phase 4: The vehicle is exactly at a standstill.

Phase 5: The vehicle begins to accelerate. The longitudinal velocity of the vehicle is still lower than limit velocity $v_G$.

Phase 6: The acceleration process is advanced. The longitudinal velocity of the vehicle is greater than limit velocity $v_G$.

In phase 1 and phase 2, condition a) is not met. The vehicle is not at a standstill.

In phase 3, all three conditions are met, so the case of a standstill is assumed, although the vehicle was still rolling. Therefore, time interval $T_n$ was introduced to avoid reprocessing first signals ω determined there as signals representing a standstill of the vehicle.

The length of time interval $T_n$ is defined by the required inclusion of rolling in braking operations below limit velocity $v_G$ as defined in a) as well as the required inclusion of filtering times of signal ω in block 23a. The length of time interval $T_n$ may be greater than an assumed realistic duration of phase 3 as well as the filtering times. In phase 4, all three conditions a), b) and c) are met at all sampling times $t_i$.

Therefore, now the output signal of rotational rate sensor 21b is input in block 23a over shorter time intervals $T_m$, and yaw rate offset $\omega_{off}$ is determined from this and from the next-to-last fulfillment interval.

In phase 5, all three conditions a), b) and c) are again met at all sampling times, although the vehicle is no longer at a standstill. Yaw rate offset $\omega_{off1}$ however, is determined from the next-to-last fulfillment interval, which still ideally falls in phase 4 in which there was still an actual vehicle standstill.

In phase 6, the three conditions a), b) and c) are no longer met at the same time, which is why the vehicle is no longer assumed to be at a standstill and no other offset values $\omega_{off1}$ are determined. Since the vehicle is now in motion, no additional offset values $\omega_{off1}$ may be determined until a new vehicle standstill, as characterized by the fulfillment of all three conditions a), b) and c), occurs.

The standstill compensation method also functions in a vehicle which is detected as not being at a standstill. In the case of a vehicle detected as not being at a standstill, valid offset value $\omega_{off1}$ determined last is read out of a memory and used again.

However, the error band having half-width Δωoff1then becomes wider over time. This means that a wider error band is assumed, the greater the amount of time elapsed since the last valid determination of offset value $\omega_{off1}$.

In contrast with the standstill compensation method, the steering angle method works only when the vehicle is not at a standstill. The basis for the calculation of the yaw rate offset in the steering angle method is the equation $$\omega_{LWS} = \frac{1}{i_L \cdot l} \cdot \frac{v}{1 + \frac{v^2}{v_{ch}^2}} \cdot \delta, \quad (1)$$

which is described in the technical literature (see, for example, Bosch Power Engineering Pocketbook, 23$^{rd}$ edition, page 707). In addition to longitudinal velocity v of the vehicle and steering wheel angle δ, steering ratio $i_L$, a characteristic vehicle velocity $v_{ch}$ and wheel base 1 also enter into this equation. The steering ratio refers to the mechanical ratio between steering angle δ and the steering angle of the front wheels.

Offset $\omega_{off2}$ is obtained as the difference between yaw rate $\omega_{LWS}$ calculated from the above equation (1) and yaw rate ω measured by the yaw rate sensor.

In addition to the calculation of an offset value $\omega_{off2}$, equation (1) may also allow the calculation of the width of an error band by the error propagation law.

Figure 5:
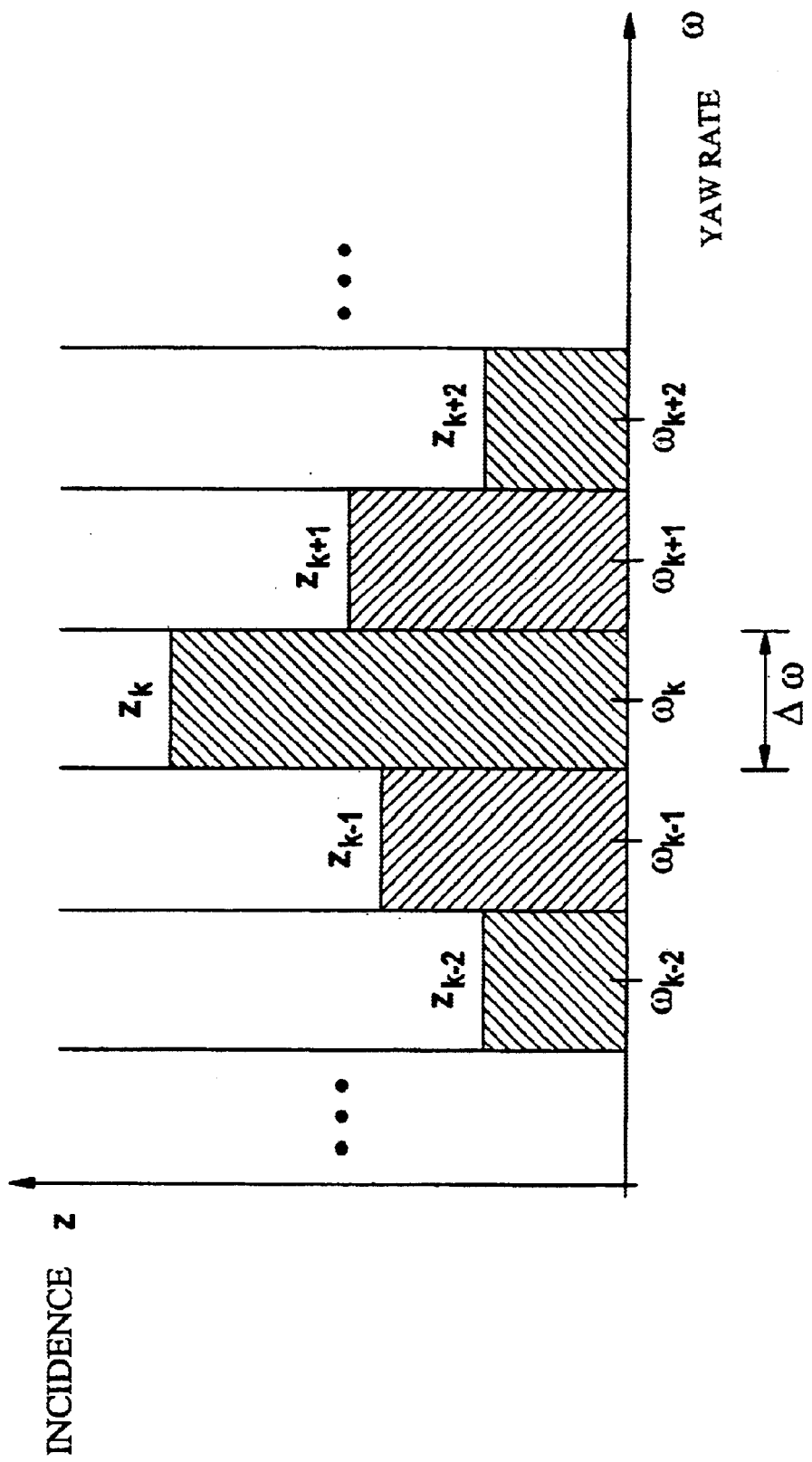
FIG. 5 illustrates in a qualitative representation a histogram such as that used as the basis for the determination of the offset value by the histogram method.

The histogram method illustrated in FIG. 5 is based on a statistical analysis of yaw rate signals ω supplied by rotational rate sensor 21b. Only discrete yaw rate values . . . , $\omega_{k-1}$, $\omega_k$, $\omega_{k+1}$, . . . having constant discrete intervals δω shall be considered. It thus holds that $\omega_{k-1}=\omega_k-\Delta\omega$ and $\omega_k+\Delta\omega$. An interval of width Δω, at the center of which the discrete yaw rate value is located, is assigned to each of these discrete yaw rate values. The interval having lower limit $$\omega_k - \frac{\Delta\omega}{2}$$

and upper limit $$\omega_k + \frac{\Delta\omega}{2}$$

thus belongs to yaw rate value $\omega_k$. These intervals are referred to below as classes.

All values of the yaw rate measured by rotational rate sensor 21b are then assigned to the respective class. This yields the histogram illustrated in FIG. 5, which indicates classes on the x axis and the number of yaw rate values falling in each class on the y axis. Yaw rate offset value $\omega_{off3}$ may be determined from this histogram by various methods:

a) the average of the class having the highest count is sent as the yaw rate offset or b) the yaw rate offset is formed by forming a weighted average from the class having the highest count and n adjacent classes on the right and left sides. This is done through the equation $$\omega_{off3} = \frac{\sum_{i=k-n}^{i=k+n} z_i \omega_i}{\sum_{i=k-n}^{i=k+n} z_i}$$

where k is the index of the class having the highest count, $\omega_i$ is the yaw rate average of the class indicated by index i, and $z_i$ is the count of the class indicated by index i. c) The yaw rate offset is formed by forming a weighted average over all classes. This may be accomplished by a linear inclusion of the counts with $$\omega_{off3} = \frac{\sum_{alle\ i} z_i \cdot \omega_i}{\sum_{alle\ i} z_i}$$

or through a quadratic inclusion of the counts with $$\omega_{off3} = \frac{\sum_{alle\ i} z_i^2 \cdot \omega_i}{\sum_{alle\ i} z_i^2}$$

The quadratic inclusion of the counts is suitable for suppressing secondary peaks occurring in the yaw rate in the histogram.

The error band may be narrower, for example, the more pronounced the peak in the histogram.

In the histogram method, it is possible to consider only yaw rate values up to a predetermined maximum absolute value for the consideration. In addition, offset values may be determined by the histogram method only if the longitudinal velocity of the vehicle exceeds a quantity to be predetermined. If these conditions are not met, then the last valid offset value determined by this method is used for the histogram method, so that the assigned error band becomes wider with an increase in the time interval. Since this histogram method is a statistical method, it requires a sufficiently large number of measured values.

Therefore, the histogram values of the last ignition cycle are input as initialization values when starting the vehicle.

The individual classes in the histogram may be filled up, for example, by simply adding up the number of yaw rate values to be assigned to the individual classes. In this example embodiment, however, the individual classes are not filled up by simply adding up the number of yaw rate values to be assigned to the individual classes but instead by low-pass filtering with an exponential characteristic. Values $z_i$ therefore always vary between 0 and filter input value $Z_{FE}$ which may be, for example, $z_{FE}=1$, where $z_i=0$ denotes an empty class. If $z_i$ assumes filter input value $z_{FE}$, i.e., for example, $Z_{FE}=1$, this means an infinite number of entries in this class. Count zhd i=$z_{FE}$ in a class, i.e., $z_{FE}=1$, for example, may thus never be reached, and only values close to the filter input value, e.g., 1, may be achieved. This prevents an overflow of classes when there are too many entries.

A separate low-pass filter is allocated to each class. The discrete equation (=differential equation) describing the i–th low-pass filter is written as follows:

$$z_i(tj)=(1-dt/tauHist)*z_i(tj-1)+(dt/tauHist)\cdot k$$

where $z_i$(tj) is the count of the i–th class at sampling time tj. The sampling time immediately preceding sampling time tj is tj−1. Thus $z_i$(tj−1) is the count of the i–th class at sampling time tj−1, dt is the interval in time between the sampling times and tauHist is the filter time constant.

The input signal of the filter is k. Factor k assumes a value of zero when the measured yaw rate value does not fall in respective class i, and factor k assumes a value of one when the measured yaw rate value does fall in respective class i. This means that the low-pass filter is triggered by an input signal which may assume two values. These two possible input signals may also be designated as "first input signal" (e.g., k=1) and "second input signal" (e.g., k=0).

The filter time constant is obtained as max(10000/vxvRef*FakTau, 200s).

Mathematical symbol max characterizes the maximum value of the two terms in the following parentheses, vxvRef denotes the vehicle velocity (measured in m/s) prevailing at the instantaneous point in time, variable FakTau is explained in greater detail below, and 200s denotes 200 seconds.

Quantity FakTau assumes a value of 5*zimax when there is motion of the vehicle. When the vehicle is at a standstill, FakTau assumes a value of 150s (=150 seconds); $z_i$max is the input value of the class-having the highest count. This then leads to FakTau assuming a small value if there are only a few entries in the histogram. tauHist also assumes a small value here, i.e., the filter time constant is low. However, if there are a great many histogram entries, then FakTau and thus also tauHist assume a large value. The filter time constant thus becomes larger and the filter is less dynamic. This may also be expressed as the filter time being dependent upon the maximum histogram level, i.e., the more pronounced the development of the histogram, the less it is able to change.

If the measured yaw rate value does not fall in the i–th class, i.e., k=1, then the disappearance of the last summand in the differential equation describing the filter leads to the value entered in the i–th class being somewhat smaller (reduction in number quantity). In other words, the filter also has the useful property that the entries in the classes subside slowly. This prevents all the classes from becoming full over a period of time and values $z_i$ for all classes being very close to a value of one. The number quantity is incremented at k=1.

It is possible not to enter individual yaw rate values into the histogram, but instead to always enter averages of ten yaw rate values. To do so, the arithmetic mean of ten yaw rate values is determined, and this arithmetic mean is entered into the histogram (via the low-pass filter allocated to the respective class). If the regulator cycle is set at 100 milliseconds (i.e., one offset value of the yaw rate sensor is determined every 100 milliseconds), then one histogram entry is made every second.

All numerical values mentioned in the preceding sections may be regarded only as examples of values (which have however proven to be suitable in implementation). This should not restrict the general scope of the present invention in any manner.

Quantity $z_i$ occurs repeatedly in the weighted averaging for quantity $\omega_{off3}$ which is represented by mathematical equations as described on the preceding pages. In the discussion of these equations, $z_i$ denoted counts, i.e., $z_i$ is equal to the number of entries in the respective partial range (class, interval). Due to the introduction of the low-pass filter, $z_i$ has the meaning of a number quantity, i.e., $z_i$ is a measure of the number of entries but no longer necessarily represents the number of entries itself. In implementation of the given computation equations for quantity $\omega_{off3}$, the number quantities supplied as the output signal of the low-pass filters may of course also be used for $z_i$. Then it is also ensured that intervals having a greater number of entries (example: 100 entries, let $z_i$ be 0.95, for example) will be weighted more heavily than intervals having a smaller number of entries (example: 17 entries, let $z_i$ be 0.43, for example)

Figure 6:
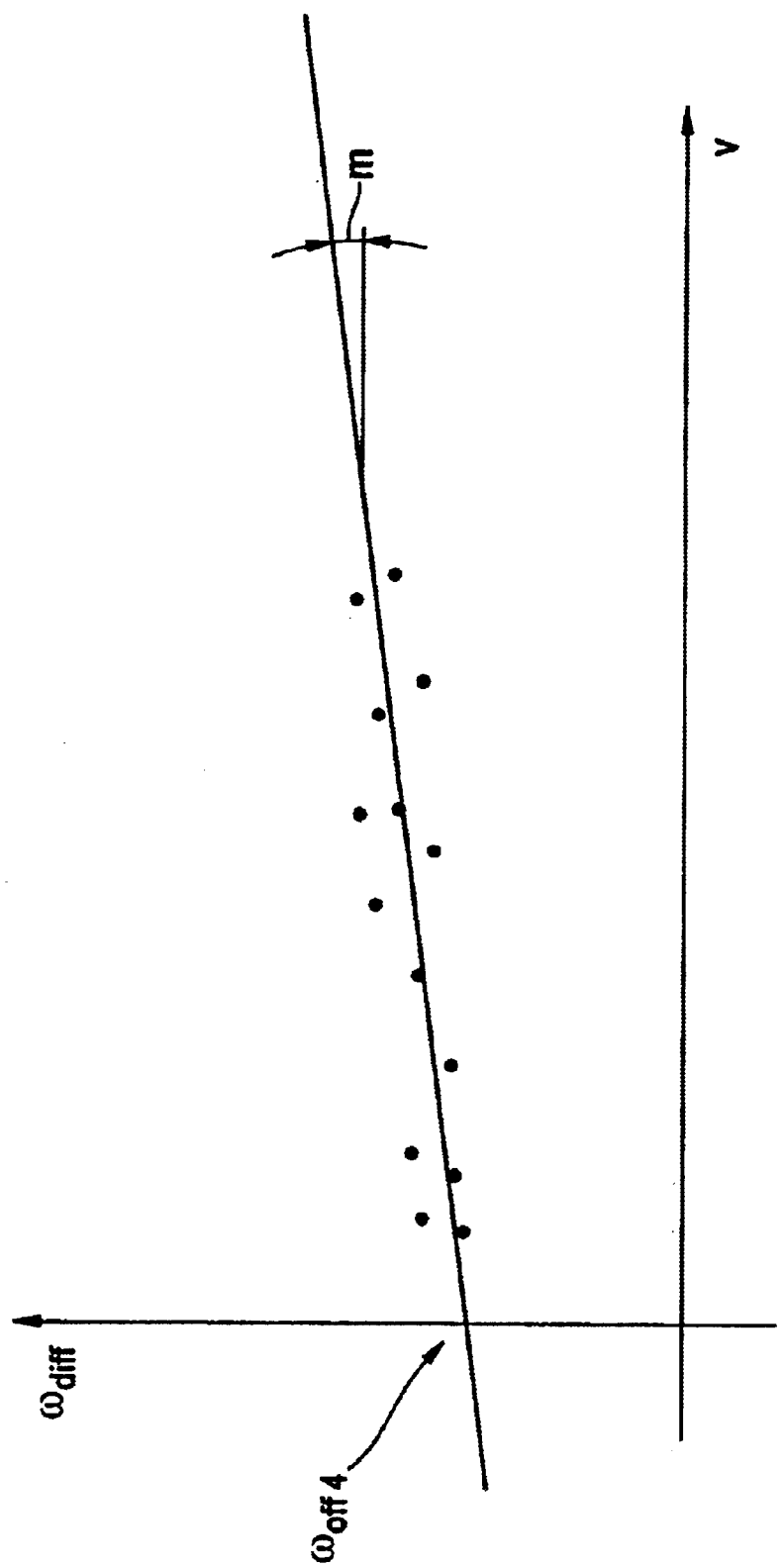
FIG. 6 illustrates in a qualitative representation an x–y diagram such as that used as the basis for the determination of the offset value by the regression method.

FIG. 6 illustrates qualitatively an x–y diagram obtained by the regression method. The x axis illustrates longitudinal velocity v of the vehicle, and a quantity $\omega_{diff}$ is plotted on the y axis. This quantity ($\omega_{diff}$ is obtained from $\omega_{diff}=\omega-\omega_{comp}$ where ω is the yaw rate measured by the rotational rate sensor and $\omega_{comp}$ is a yaw rate determined from the wheel rotational speeds as represented by the equation $$\omega_{comp} = \frac{\frac{v_r}{r+\Delta r_r} \cdot r - \frac{v_l}{r+\Delta r_l} \cdot r}{b}$$

where $v_l$ and $v_r$ are the actual wheel speeds on the left and right wheels, respectively, of the non-driven axle, r is the nominal value of the radius, $r+\Delta r_l$ is the actual radius of the left wheel of the non-driven axle, $r+\Delta r_r$ is the actual radius of the right wheel of the non-driven axle, and b is the wheel base.

This determination of $\omega_{com}$ is based on the fact that different wheel rotational speeds occur on the inside wheels and the outside wheels when turning a corner.

It may be illustrated by analytical considerations that there is a linear relationship $\omega_{diff}=\omega_{off}+m \cdot v$ between $\omega_{diff}$ and v in first approximation, where $\omega_{off}$ denotes the y axis intercept and m denotes the slope, which also depends on wheel radii and wheel base. The following equation holds approximately for slope m $$m = \frac{1}{b} \cdot \left(\frac{\Delta r_r}{r} - \frac{\Delta r_l}{r}\right) \qquad (2)$$

At discrete points in time, a new point is plotted in the x–y diagram by measuring v and determining $\omega_{diff}$. Then a regression line is drawn through these points. From this regression line, the y axis intercept and the slope m are determined. The y axis intercept represents yaw rate offset $\omega_{off4}$ and slope m provides information regarding differences in the wheel radii of the non-driven wheels by manner of-equation (2). These differences may be due to tolerances in the tires.

Determination of these differences may lead to savings in terms of a tire tolerance compensation.

If slope m has a value of zero, then the non-driven wheels have the same wheel radii.

Since the calculation of $\omega_{comp}$ is valid only for slip-free wheels, the wheels of the non-driven axle should be taken into account in the regression method.

The following three conditions are a prerequisite for the validity of the regression method:
 1) The longitudinal velocity of the vehicle is greater than a predetermined limit velocity.
 2) Yaw rate ω is smaller than a predetermined limit yaw rate.
 3) Transverse acceleration $a_y$ of the vehicle is less than a predetermined limit transverse acceleration.

Point 1) ensures that the regression method is not being used for a vehicle at a standstill. Points 2) and 3) ensure that the vehicle is not in a limit range in terms of driving dynamics.

The regression method requires a velocity variation. If this velocity variation is too low, i.e., the points in the x–y diagram are displaced too far in the direction of the x axis, then the result becomes inaccurate.

The error band takes into account the variance and the average of the values of the longitudinal velocity of the vehicle, for example.

From offset values $\omega_{off1}, \ldots, \omega_{off4}$ thus determined and the respective error bands having half-widths $\Delta\omega_{off1}, \ldots, \Delta\omega_{off4}$, a corrected offset value $\omega_{offcorr}$ is determined in block 24.

The corrected offset value may be determined in various manners. For example, as illustrated in FIG. 7, the corrected offset value may be determined as the average of the minimum of the maximum values and of the maximum of the minimum values. To do so, a minimum value $\omega_{offi}-\Delta\omega_{offi}$ and a maximum value $\omega_{offi}+\Delta\omega_{offi}$ are calculated from offset value $\omega_{offi}$ determined by the i-th method and from the respective error band having half-width $\Delta\omega_{offi}$. Then the minimum and maximum values of all four methods are plotted on the ω axis. Of the four minimum values plotted, the largest minimum value (labeled as $\max(\omega_{offi}-\Delta\omega_{offi})$ in FIG. 7) is determined. For the four maximum values plotted, the smallest maximum value (labeled as $\min(\omega_{offi}+\Delta\omega_{offi})$ in FIG. 7) is determined. For the case when the largest minimum value is smaller than the smallest maximum value, there is a common intersection of all four methods with the largest minimum value as the lower limit and with the smallest maximum value as the upper limit.

By forming an average between the minimum of all maximum values and the maximum of all minimum values, the midpoint of the intersection is determined and used as corrected offset value $\omega_{offcorr}$. This method may also be used for the case when there is no common intersection, i.e., the largest minimum value is greater than the smallest maximum value.

As an alternative, it is also possible to obtain the corrected offset value by weighted averaging from all four offset values thus determined. In weighted averaging, the offset value whose error band width is smallest may have the greatest weight. This may be accomplished, for example, by performing the following weighted averaging:

$$\omega_{offkor} = \frac{\sum_{i=1}^{4}\left(\frac{\omega_{off\,i}}{\Delta\omega_{off\,i}}\right)}{\sum_{i=1}^{4}\left(\frac{1}{\Delta\omega_{off\,i}}\right)}$$

The determination of the corrected offset value of the rotational rate sensor may be repeated at regular or irregular time intervals. In practice, time intervals may be on the order of 0.1 second to 1 second.

What is claimed is:

1. A method of determining an offset value of an output signal of a vehicle sensor, comprising the steps of:

determining at least one value of the output signal of the vehicle sensor;

dividing a value range of the output signal of the vehicle sensor into at least two partial ranges;

allocating the value of the output signal of the vehicle sensor to the partial ranges;

determining a number of number quantities representing the values of the output signal of the vehicle sensor allocated to the partial ranges;

triggering a low-pass filter, in whose allocated partial range the value of the output signal determined at a sampling time falls, with a first input signal; and triggering at least another low-pass filter, in whose allocated value ranges the value of the output signal determined at the same sampling time does not fall, with a second input signal, the second input signal differing from the first input signal;

wherein the number of number quantities are determined in the determining step by at least one of the low-pass filters, and wherein the low-pass filters are allocated to the at least two partial ranges, each of the low-pass filters being configured to determine the number quantity allocated to its partial range.

2. The method according to claim 1, wherein the low-pass filter includes an exponential characteristic.

3. The method according to claim 1, further comprising the steps of:

incrementing, as a result of triggering of the low-pass filter with the first input signal, the number quantity determined by this low-pass filter; and decrementing, as a result of the triggering of the low-pass filters with the second input signal, the number quantities determined by these low-pass filters.

4. The method according to claim 1, further comprising the steps of:

determining a first average by a first method from at least two successively determined values of the output signal of the vehicle sensor; and allocating averages obtained by the first method to the partial ranges.

5. The method according to claim 1, wherein the vehicle sensor is configured to detect a yawing motion of the vehicle.

6. The method according to claim 5, further comprising the step of using the offset value determined for at least one of automatic distance regulation and control adaptive cruise controlling the vehicle.

7. The method according to claim 1, further comprising the step of determining the offset value by forming a weighted average in accordance with the partial range having a largest number of allocated values of the output signal and at least one adjacent interval.

8. The method according to claim 7, wherein weighting factors of the weighted average include one of linear values and quadratic values of the number quantities.

9. A device for determining an offset value of an output signal of a vehicle sensor, the sensor configured to determine at least one motion of a vehicle, comprising:

a first arrangement configured to determine output signals of the vehicle sensor;

a second arrangement configured to divide a value range of the output signal of the vehicle sensor into at least two partial ranges;

a third arrangement configured to allocate the values of the output signal of the vehicle sensor to the partial ranges; and a fourth arrangement configured to determine number quantities representing a number of values of the output signal of the vehicle sensor allocated to the partial ranges, the fourth arrangement including at least one low-pass filter configured to determine the number quantities;

a triggering arrangement to trigger one of the at least one low-pass filter, in whose allocated partial range the value of the output signal determined at a sampling time falls, with a first input signal, and to trigger at least another of the at least low-pass filter, in whose allocated value ranges the value of the output signal determined at the same sampling time does not fall, with a second input signal, wherein the second input signal differs from the first input signal, wherein the low-pass filters are allocated to the at least two partial ranges, each of the low-pass filters being configured to determine the number quantity allocated to its partial range.

10. The device according to claim 9, wherein the low-pass filter includes an exponential characteristic.

11. The device according to claim 9, wherein
as a result of triggering of the low-pass filter with the first input signal, the number quantity determined by this low-pass filter is incremented; and
as a result of the triggering of the low-pass filters with the second input signal, the number quantities determined by these low-pass filters is decremented.

12. The device according to claim 9, wherein a first average is determined by a first method from at least two successively determined values of the output signal of the vehicle sensor, and averages obtained by the first method are allocated to the partial ranges.

13. The device according to claim 9, wherein the vehicle sensor is configured to detect a yawing motion of the vehicle.

14. The device according to claim 13, the offset value is used to determine for at least one of automatic distance regulation and control adaptive cruise controlling the vehicle.

15. The device according to claim 9, wherein the offset value is determined by forming a weighted average in accordance with the partial range having a largest number of allocated values of the output signal and at least one adjacent interval.

16. The device according to claim 15, wherein weighting factors of the weighted average include one of linear values and quadratic values of the number quantities.

* * * * *

UNITED STATES PATENT AND TRADEMARK OFFICE
CERTIFICATE OF CORRECTION

PATENT NO. : 6,810,311 B2
DATED : October 26, 2004
INVENTOR(S) : Hermann Winner et al.

It is certified that error appears in the above-identified patent and that said Letters Patent is hereby corrected as shown below:

Column 5,
Line 38, change "$\Delta\delta_{off1}$" to -- $\Delta\omega_{off1}$ --

Column 6,
Line 28, change "in FIG. 3" to -- in FIG. 3. --
Line 33, change "$...=\omega_{off1}-\Delta_{off1}$" to -- $...=\omega_{off1}-\Delta\omega_{off1}$ --
Line 40, change "$...=(\omega_{off1}$" to -- $...= \omega_{off1}$ --

Column 8,
Line 62, change "$\Delta\omega off1$" to -- $\Delta\omega_{off1}$ --

Column 9,
Line 25, change "$\delta\omega$" to -- $\Delta\omega$ --
Line 26, change "$...=\omega_k-\Delta\omega and$" to -- $...=\omega_k-\Delta\omega$ and --
Line 27, change "$\omega_k+\Delta\omega.$" to -- $\omega_{k+1}=\omega_k+\Delta\omega.$ --
Line 64, start new line -- c) The --

Column 10,
Line 44, change "Count $zhd\ i=Z_{FE}$" to -- Count $Z_i=Z_{FE}$ --

Column 11,
Line 9, change "5*zimax" to -- $5*z_i$max --

Column 12,
Line 15, change "$\omega_{com}$" to -- $\omega_{comp}$ --
Line 36, change "of-equation (2)." to -- of equation (2). --

Column 13,
Lines 12 and 14, change "FIG. 7)" to -- FIG. 7 --

UNITED STATES PATENT AND TRADEMARK OFFICE
CERTIFICATE OF CORRECTION

PATENT NO.     : 6,810,311 B2
DATED          : October 26, 2004
INVENTOR(S)    : Hermann Winner et al.

It is certified that error appears in the above-identified patent and that said Letters Patent is hereby corrected as shown below:

Column 14,
Line 27, change "claim 5,further" to -- claim 5, further --

Signed and Sealed this

Twelfth Day of July, 2005

JON W. DUDAS
*Director of the United States Patent and Trademark Office*